United States Patent [19]

Chatelin et al.

[11] Patent Number: 4,728,678

[45] Date of Patent: Mar. 1, 1988

[54] PROCESS FOR GRAFTING UNSATURATED ORGANIC COMPOUNDS TO GLASS PRODUCTS

[75] Inventors: Roger Chatelin, Lozanne; Louis Gavet, Lyons, both of France

[73] Assignee: Saint-Gobain Recherche, Aubervilliers, France

[21] Appl. No.: 936,292

[22] Filed: Nov. 28, 1986

[30] Foreign Application Priority Data

Nov. 28, 1985 [FR] France ............................... 85 17578

[51] Int. Cl.$^4$ ..................... C08F 283/2; B32B 17/04
[52] U.S. Cl. ................................. 523/203; 427/407.2; 427/407.3; 427/387; 427/412.1; 427/214; 523/466; 523/527
[58] Field of Search ................ 427/407.2, 407.3, 387, 427/412.1, 214; 523/203, 466, 527

[56] References Cited

FOREIGN PATENT DOCUMENTS 8517612 11/1985 France .
1138065 12/1968 United Kingdom .
1456865 12/1976 United Kingdom .

*Primary Examiner*—Sam Silverberg
*Attorney, Agent, or Firm*—Pennie & Edmonds

[57] ABSTRACT

The invention relates to a process for the grafting of unsaturated monomers to the surface of glass substrates. The process comprises applying to the glass substrates a solution comprising a silane having a double ethylene bond, contacting the products thus coated with an atmosphere formed by a mixture of ozone and oxygen, and placing these coated products in contact with an unsaturated organic monomer. The monomer may be added in the form of a solution, an emulsion or a suspension. The products thus obtained may have a number of technical applications.

20 Claims, No Drawings

PROCESS FOR GRAFTING UNSATURATED ORGANIC COMPOUNDS TO GLASS PRODUCTS

TECHNICAL FIELD

The invention relates to a process for grafting unsaturated monomers to the surface of glass substrates.

BACKGROUND OF THE INVENTION

Grafting of organic compounds to the surface of glass products makes it possible to improve their characteristics or those of composite materials when these products are thereafter associated with another matrix. Thus, for example, it is well known that the mechanical, electrical and chemical properties of composite materials which have been reinforced with glass fibers are improved when there is an increased cohesion between the fibers and the matrix. One method for obtaining this strong cohesion is the use of fibers to which have been grafted unsaturated monomers able to react with the constituents of the matrix to be reinforced. A number or processes for grafting such monomers to glass fibers are already known but they all generally begin with a treatment of the fiber.

One such process involves subjecting the fiber to a flow of accelerated electrons, but this treatment does not always provide suitable results. When the fiber has previously been coated with a silane-based compound, it is believed that the radiation generates short-lived species or gives rise to free radicals that are not labile at the temperatures to which the fiber is subjected in the monomer solution. It has also been postulated that the accelerated electrons cause the bonds of the silane molecule to break at the level of the silicon atom, thus permitting a reaction with the grafting reagents.

An alternate process known in the prior art involves subjecting the fiber to the coupled action of water and temperature, then placing it in a vacuum to eliminate the oxygen and subsequently, contacting it with a solution or a mixture of monomers containing a catalyst. The catalyst, for example a peroxide, has the effect of triggering a homopolymerization or copolymerization reaction between the surface of the fiber and the polymer. One feature which limits the advantage of such a process is the length of time required for this process.

The discussion above relating to the treatment of glass fibers also applies to other glass products such as glass microballs or microspheres, glass packagings and glazings intended for buildings as well as for the automobile industry.

SUMMARY OF THE INVENTION

The invention has as its object the development of an effective monomer grafting process suited to glass products coated with silane compounds.

The invention has as a further object the development of a grafting process which is capable of completion in a rather limited time period.

Applicants' invention therefore concerns a process for forming a coated glass substrate. This process comprises the steps of applying to a surface portion of the substrate a solution of a silane having a double ethylene bond in order to form a substrate coated with the silane solution; contacting this coated substrate with an atmosphere comprising a mixture of oxygen and ozone so as to convert the silane coating to an ozonide and contacting the ozonide-coated substrate with an unsaturated monomer so as to graft the unsaturated monomer to the surface of the substrate in order to form a coating thereof upon the substrate.

The glass substrate may be selected from the group consisting of glass fibers, glass microballs, glass microspheres, glazings and glass packagings.

The process of the invention may further comprise ensuring that the silane solution is deposited in a uniform manner on the entire surface of the glass substrate. The silane solution utilized in the invention may comprise from about 0.5 to about 5% by weight of silane.

Prior to its use in the process of the invention, the unsaturated monomer may be prepared in the form of a solution, an emulsion or a suspension. Examples of these unsaturated monomers may include aqueous solutions of acrylic acid or dimethylaminoethyl methacrylate or emulsions of styrene in water.

The time interval between removing the ozonide-coated substrate from the oxygen-ozone atmosphere and contacting it with the unsaturated monomer should be limited to less than thirty minutes. In addition, the ozonide-coated substrate may be contacted with the unsaturated monomer for a period of up to about two hours.

The process of the invention may further comprise maintaining the concentration of the unsaturated monomer at a level greater than about 10 weight per cent. Further, the temperature of the unsaturated monomer, during the period in which the monomer initially contacts the ozonide-coated substrate, should be limited to between about 60°–100° C.

A further additional step in the process of the invention may comprise adding a homopolymerization inhibitor, such as sodium methallyl sulfonate, to the unsaturated monomer.

An alternate embodiment of applicants, invention is a process for forming a composite material which comprises combining glass fibers which have been coated with an unsaturated monomer by the process described above with a synthetic resin such as a thermosetting resin. Examples of such thermosetting resins are polyester resins and epoxy resins. In this for forming a composite material, one may again utilize the unsaturated monomers discussed above which include, for example, aqueous solutions of acrylic acid and dimethylaminoethyl methacrylate as well as emulsions of styrene in water.

A further alternate embodiment of applicants' invention is a process for forming a support for use as an ionexchange medium in separation techniques which comprises coating glass fibers with an unsaturated monomer by the method described above and subsequently forming the support from said coated fibers. As above, one may again utilize such unsaturated monomers as, for example, solutions of acrylic acid and dimethylaminoethyl methacrylate and emulsions of styrene in water.

DETAILED DESCRIPTION OF THE PREFERRED EMBODIMENTS

These aims have now been obtained with the use of our novel process described herein which comprises initially coating the glass substrate with a silane having a double ethylene bond, placing the coated substrate in an atmosphere containing ozone, then placing the coated substrate in contact with an unsaturated monomer in a solution, an emulsion or a suspension. The silane is deposited on the glass substrate generally through the use of an aqueous solution. The silane concentration of this solution, expressed in percent by weight, is preferably between 0.5% and 5%. Any silane composition having at least one double bond is suitable for use with the process disclosed herein.

Application of the silane to the glass substrate can be done by several means, for example, by spraying an aqueous solution of the silane onto the surface of the glass or by immersing the substrate in the solution. Thus, in the case of a glass fiber, it is possible to spray the solution on a mat of staple fibers, or to immerse a package of continuous yarn in the solution.

For continuous yarns, however, it is preferable to deposit the silane on the fibers during their formation, which occurs by mechanically drawing the glass threads flowing from the orifices of a spinneret. The silane is thus deposited by an oiling element, well known to those of ordinary skill in the art, which may be placed in the path of the glass fibers as they are produced. This oiling element makes possible the simultaneous drawing of the fibers and depositing of the silane thereupon. Further, the continuous yarn fibers are thus uniformly covered over their entire length by the aqueous silane solution.

The glass substrates thus coated with silane are then placed in an enclosure whose temperature can be regulated and maintained at a temperature below 100° C. The enclosure is then flushed with a preferred gaseous mixture of oxygen and ozone or with ozone alone. The ozone may be previously obtained by subjecting a flow of oxygen to the action of a corona discharge within a standard ozone generator.

Upon contacting the coated glass substrate with the ozone, the silane reacts to form an ozonide. Other compounds such as peroxides and hydroperoxides may be formed as well. These results have been determined from the wellknown mechanism of the addition of ozone to unsaturated compounds such as ethylene compounds.

The coated glass substrates thus treated are then transferred into a liquid bath containing the unsaturated monomer to be grafted thereto. Any monomer possessing vinylic or ethylenic unsaturation in its structure is suitable for use with the process disclosed herein. The liquid may be a solution, for example, an aqueous solution of acrylic acid or dimethylaminoetyl methacrylate or an emulsion, for example, of styrene in water. The immersion time of the coated substrates in this liquid may range up to several hours.

In order to maximize the amount of grafted unsaturated organic compound to be distributed over the surface and to obtain the best possible distribution, it is important to meet certain conditions:

It is necessary to select a silane having a high affinity for the surface of the glass substrate. These silanes are well known to those of the ordinary skill in the art.

It is important that the silane be distributed as uniformly as possible over the surface of the glass product.

The time between the end of the ozonizing treatment and the immersion of the coated substrate in the liquid bath containing the substance to be grafted should be as short as possible. Generally, this interval should preferably be less than 30 minutes.

The concentration of the unsaturated monomer in the treatment liquid is preferably greater than 10% by weight.

When the glass substrate is put in contact with the treatment liquid, the initial temperature of the liquid should be sufficient to cause the decomposition of the oxygenated compounds formed by the ozonizing treatment and to trigger the grafting reaction. This reaction can then be continued at lower temperatures. The initial temperature of the treatment liquid is preferably greater than 60° C., but preferably less than 100° C.

It is advantageous to add to the treatment liquid a homopolymerization inhibiting agent such as described in the patent application filed on Nov. 28, 1985 under Ser. No. 85.17612 in the name of l'Institut Textile De France and titled "HOMOPOLYMERIZATION INHIBITING AGENT FOR GRAFTING REACTIONS GIVING RISE TO FREE RADICALS, the subject matter of which is expressly incorporated herein by reference. This inhibiting agent should prevent the monomer from undergoing a polymerization reaction with itself without hindering the grafting reaction.

The inhibiting agent should comprise both a portion which renders it compatible with the grafting medium, for example, a sulfonic or carboxylic moiety, as well as a homopolymerization inhibiting portion, for example, an unsaturated moiety of the allyl or cyclic type.

The process of the invention may be better understood by examining grafting operations performed by way of example on glass fibers. The amount of grafted substance has been calculated by determining the rate of grafting which is measured as follows:

A sample of grafted fibers is taken, rinsed with distilled water and treated to eliminate from the surface of the fibers the products that have not reacted. After drying in an oven, the fibers are weighed. If $P_o$ is the mass of a sample of glass fibers before the grafting operation and $P_g$ is the mass of said sample after grafting, the rate of grafting, $T_g$, is obtained by the following relation:

$$T_g = \frac{P_g - P_o}{P_g} \times 100$$

A number of tests were made on the glass fibers obtained from two different glasses.

The first glass (I), well known under the name glass E in the glass fiber reinforcement industry, is defined within U.S. Pat. Nos. 2,334,961 and 2,571,074, the contents of which are expressly incorporated herein by reference. Glass E has approximately the following composition by weight:

$SiO_2 = 54.5\%$; $Al_2O_3 = 14.5\%$; $CaO = 17.5\%$; $MgO = 4\%$; $B_2O_3 = 8\%$.

The second glass (II) used in the glass fiber industry, normally utilized for thermal insulation, corresponds approximately to the following composition by weight:

$SiO_2 = 64\%$; $Al_2O_3 = 3.5\%$; $CaO = 7\%$; $MgO = 3\%$; $Na_2O + K_2O = 16.5\%$; $B_2O_3 = 5.5\%$.

EXAMPLES

The following examples illustrate the results obtained under various grafting conditions upon substrate comprised of Glass I and Glass II. These examples are set forth for the purposes of illustration only and are not to be construed as limiting the scope of the invention in any manner.

The first series of tests were made on continuous glass fibers obtained by mechanical drawing of glass I. During their drawing, these fibers were coated with an unsaturated silane compound in aqueous solution, having the following formula:

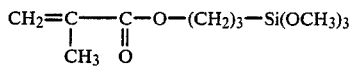

The aqueous solution contained about 5% of this silane compound. The amount of silane deposited on the fibers was on the order of 0.5 to 1.5% by weight.

The glass fibers thus treated, which were in the form of packages, were placed in an enclosure whose temperature was regulated at 50° C. As soon as this temperature was reached, the fibers were flushed with a mixture of oxygen and ozone for an hour.

These treatment conditions were common to the various glass fibers which were later subjected to the action of aqueous solutions of acrylic acid. The grafting conditions and the results obtained therefore appear in attached Table 1.

Besides acrylic acid, all the solutions contained 0.1% of sodium methallyl sulfonate (SMAS) for use as a homopolymerization inhibitor, except the solutions marked with an asterisk which contained 0.2%.

The grafting rate was maximized when the initial temperature of the solutions was equal to 80° C. but was reduced to practically zero at initial temperatures less than or equal to 60° C.

In a second series of tests, glass fibers I were coated under the same conditions as described above with a saturated silane compound in an aqueous solution having the following formula:

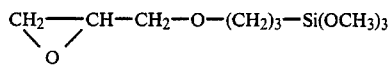

The aqueous solution contained about 5% of the silane compound. The amount of silane deposited on the fibers was on the order of 0.5% to 5% by weight.

During this second series of tests, the temperature of the enclosure during ozonizing was maintained at 20° C. or 50° C. The ozonizing phase lasted one hour for all tests. The fibers were then subjected to the action of various aqueous solutions of acrylic acid, all of which contained 0.1% of SMAS. The results obtained are set forth in Table 2.

Regardless of the conditions selected, the grafting rate for the second series of tests was always zero, which demonstrates the ineffectiveness of using a saturated silane within the framework of the invention.

A third series of tests were made on staple glass fibers obtained by centrifuging molten glass and drawing the fibers therefrom by fluid means. The composition used was that of glass II.

The silane used was the unsaturated silane used in the first series of tests. The aqueous solution contained about 5% of the silane compound. It was deposited on the fibers, which were in the form of a felt, by spraying. The amount of silane thus deposited was on the order of 6% by weight on the average.

The fibers were ozonized at different temperatures for an hour. They were then subjected to the action of an aqueous solution containing 15% acrylic acid and 0.2% SMAS for an hour and a half. The temperature of this solution was maintained at 80° C. The results obtained are shown in Table 3.

As a result of these tests it was determined that the grafting rate was relatively high at times but it varied considerably from one test to the next under apparently equal conditions. These irregular results are likely due to the mode of depositing the silane and the presentation of the fibers which could be the cause of great variations in regard to amounts of silane actually deposited.

A fourth series of tests were made on glass fibers similar to those used in the third series of tests. The silane used was also the same.

The aqueous solution used contained about 2% of the silane compound and it was deposited on the fibers by spraying. The amount of silane thus deposited was on the order of about 6% by weight on an average.

The glass fibers were ozonized at a temperature on the order of about 25° C. for an hour. They were then immersed in aqueous solutions of methacrylamide, all of which contained 2.5% formic acid.

During a first test in this series, the fibers were treated in a solution containing 5% methacrylamide brought to 80° C., for two hours. The grafting rate obtained was 15.9%.

In a second test, the fibers were treated in a solution containing 7% methacrylamide, while the same treatment conditions were observed. The grafting rate obtained was 30%.

During a third test, the fibers were treated in a solution containing 5% methacrylamide brought to 70° C. for sixteen hours. The grafting rate obtained then reached 34%.

In a fifth series of tests the various solutions and emulsions used all contained 0.1% SMAS. A first test was performed on glass fibers of type II under the same conditions as the preceding series of tests. Activation of the fibers by ozone was performed at 25° C. for an hour. The activated fibers were then immersed in an emulsion of 10% styrene in water brought to 80° C., for an hour and a half. The grafting rate obtained was 16%.

A second test was made under the same conditions while changing only the grafting solution. The latter was a 20% aqueous solution of dimethylaminoethyl methacrylate (DMEM). The grafting rate obtained was 18%.

A third test was made under the same conditions, but while using another silane having the following formula

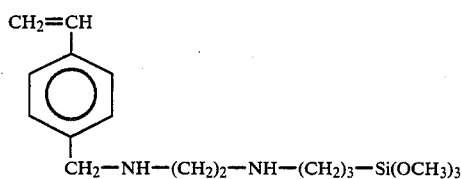

The aqueous solution sprayed on the fibers contained 2% of this silane compound and the average deposit by weight of silane on the fibers was about 5%. The fibers thus treated were immersed in a 15% aqueous solution of acrylic acid, brought to 80° C. for an hour and a half. The measured grafting rate was 11%.

A fourth test was made under the same conditions as the preceding test but used a 20% aqueous solution of DMEM. The measured grafting rate was 12%.

The glass fibers tested above, when coated with an unsaturated silane and then activated with ozone, maintained a considerable grafting capacity for a relatively long time. It was observed that glass fibers, treated under the conditions of the third series of tests (see, e.g., the 2nd line of Table 2) and stored without special precautions (ambient air, ambient temperature) exhibited a number of activated sites which slowly diminished in time. This phenomenon was reflected by increasingly smaller grafting rates. Thus, with an acrylic acid solution, the grafting rate, which was 12% after 30 minutes of storing was no more than 9% at the end of 2 hours, 5% after 5 hours and became zero at the end of 24 hours.

The glass products grafted according to the invention can have numerous uses. For example, if fibers are involved, they can be associated with synthetic resins, such as polyester resins, to achieve composite materials; they can go into the making of supports that can be used as ion exchangers for separative techniques; they can also be used as catalytic supports or to support active molecules in certain oxidoreduction reactions. If glazings or glass packagings are involved, the grafting makes it possible to achieve a surface layer which can play, for example, a protective role by improving the resistance to impact and abrasion or a filtering role in regard to certain radiations.

TABLE 1

| GRAFTING SOLUTION | | |
|---|---|---|
| Concentration of the Monomer | Temperature (°C.) | $T_g$ (%) |
| 10 | 100 | 2.0 |
| 15 | 100 | 5.0 |
| 20 | 100 | 9.5 |
| 15 | 80 | 14.5 |
| 20 | 80 | 13.0 |
| *15 | 80 | 5.0 |
| *20 | 80 | 5.0 |
| *15 | 60 | 0 |
| *15 | 25 | 0 |

TABLE 2

| | GRAFTING SOLUTION | | |
|---|---|---|---|
| Temperature of Ozone treatment (°C.) | Concentration of the Monomer | Temperature (°C.) | $T_g$ (%) |
| 20 | 20 | 100 | 0 |
| 50 | 10 | 100 | 0 |
| 50 | 15 | 100 | 0 |
| 50 | 20 | 100 | 0 |

TABLE 3

| | GRAFTING SOLUTION | | |
|---|---|---|---|
| Temperature of Ozone treatment | Concentration of the Monomer | Temperature (°C.) | $T_g$ (%) |
| 20 | 15 | 80 | 6.0 |
| 25 | 15 | 80 | 13.0 |
| 35 | 15 | 80 | 6.0 |
| 35 | 15 | 80 | 10.5 |
| 35 | 15 | 80 | 8 |
| 35 | 15 | 80 | 13 |

While it is apparent that the invention herein disclosed is well calculated to fulfill the objectives stated above, it will be appreciated that numerous modifications and embodiments may be deviced by those skilled in the art, and it is intended that the appended claims cover all such modifications and embodiments as fall within the true spirit and scope of the present invention.

We claim:

1. A process for forming a coated glass substrate comprising:
    applying to a surface portion of said substrate a solution comprising a silane having a double ethylene bond to form a substrate coated with said silane solution;
    contacting said coated substrate with an atmosphere comprising a mixture of oxygen and ozone so as to convert said silane coating to an ozonide; and
    contacting said ozonide coated substrate with an unsaturated monomer so as to graft said unsaturated monomer to the surface of said substrate and thus form a coating thereof upon said substrate.

2. The process according to claim 1 wherein said glass substrate is selected from the group consisting of glass fibers, glass microballs, glass microspheres, glazings and glass packagings.

3. The process according to claim 1 which further comprises depositing said silane solution in a uniform manner on the entire surface of said glass substrate.

4. The process according to claim 1 wherein the concentration of silane in solution is between about 0.5 and 5% by weight.

5. The process according to claim 1 which further comprises preparing said unsaturated monomer prior to its use in said process as a solution, an emulsion or a suspension.

6. The process according to claim 1 which further comprises limiting a time interval between removing said ozonide-coated substrate from the oxygen-ozone atmosphere and contacting said ozonide-coated substrate with said unsaturated monomer to less than thirty minutes.

7. The process according to claim 1 wherein said ozonide-coated substrate is contacted with said unsaturated monomer for a period of up to about 2 hours.

8. The process according to claim 1 which further comprises maintaining the concentration of said unsaturated monomer at a level greater than about 10% by weight.

9. The process according to claim 1 which further comprises limiting the temperature of said unsaturated monomer during a period in which said monomer initially contacts said ozonide-coated substrate to between about 60°–100° C.

10. The process according to claim 1 which further comprises adding a homopolymerization inhibitor to said unsaturated monomer.

11. The process according to claim 10 wherein said homopolymerization inhibitor is sodium methallyl sulfonate.

12. The process according to claim 1 which further comprises contacting said ozonide-coated substrate with an aqueous solution of acrylic acid.

13. The process according to claim 1 which further comprises contacting said ozonide-coated substrate with an emulsion of styrene in water.

14. The process according to claim 1 which further comprises contacting said ozonide-coated substrate with an aqueous solution of dimethylaminoethyl methacrylate.

15. A process for forming a composite material which comprises combining glass fibers coated with an unsaturated monomer by the process of claim 1 with a synthetic resin so as to form said composite material.

16. The process of claim 15 wherein the synthetic resin is a thermosetting resin.

17. The process of claim 16 wherein the thermosetting resin is selected from the group consisting of a polyester resin and an epoxy resin.

18. The method of claim 15 wherein the unsaturated monomer is selected from the group consisting of an aqueous solution of acrylic acid, an emulsion of styrene in water and an aqueous solution of dimethylaminoethyl methacrylate.

19. A process for forming a support for use as an ion exchange medium for separation applications which comprises coating glass fibers with an unsaturated monomer by the process of claim 1 and subsequently forming said support therefrom.

20. The method of claim 19 wherein the unsaturated monomer is selected from the group consisting of an aqueous solution of acrylic acid, an emulsion of styrene in water and an aqueous solution of dimethylaminoethyl methacrylate.

* * * * *